(12) United States Patent
Chen et al.

(10) Patent No.: US 7,188,098 B2
(45) Date of Patent: Mar. 6, 2007

(54) QUERY TRANSFORMATION FOR UNION ALL VIEW JOIN QUERIES USING JOIN PREDICATES FOR PRUNING AND DISTRIBUTION

(75) Inventors: Yao-Ching S. Chen, Saratoga, CA (US); Ding-Wei L. Chieh, Cupertino, CA (US); Huong T. Tran, San Jose, CA (US); Yumi K. Tsuji, San Jose, CA (US); Guogen Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 10/669,749

(22) Filed: Sep. 24, 2003

(65) Prior Publication Data
US 2005/0065926 A1    Mar. 24, 2005

(51) Int. Cl.
*G06F 7/00*    (2006.01)
*G06F 17/00*   (2006.01)
*G06F 17/30*   (2006.01)

(52) U.S. Cl. .............................. 707/2; 707/4; 707/102
(58) Field of Classification Search ................ 707/1–5, 707/10, 100, 102
See application file for complete search history.

(56) References Cited

U.S. PATENT DOCUMENTS 5,276,870 A * 1/1994 Shan et al. .................... 707/2
5,822,750 A * 10/1998 Jou et al. ...................... 707/2

(Continued)

OTHER PUBLICATIONS

Rada Chirkova, Alon Y. Halevy and Dan Suciu 2002, A formal perspective on the view selection problem, pp. 216-227.*

(Continued)

*Primary Examiner*—Don Wong
*Assistant Examiner*—Merilyn Nguyen
(74) *Attorney, Agent, or Firm*—Gates & Cooper LLP

(57) ABSTRACT

A method, apparatus, and article of manufacture for optimizing a query in a computer system, wherein the query is performed by the computer system to retrieve data from a database stored on the computer system. The optimization includes: (a) combining join predicates from a query with local predicates from each branch of one or more UNION ALL views referenced by the query; (b) analyzing the combined predicates; and (c) not generating the join when the analysis step indicates that the combined predicates lead to an empty result.

30 Claims, 6 Drawing Sheets

U.S. PATENT DOCUMENTS

| | | | |
|---|---|---|---|
| 5,963,933 A * | 10/1999 | Cheng et al. | 707/2 |
| 6,092,062 A * | 7/2000 | Lohman et al. | 707/2 |
| 6,324,533 B1 | 11/2001 | Agrawal et al. | |
| 6,339,769 B1 * | 1/2002 | Cochrane et al. | 707/2 |
| 6,345,267 B1 | 2/2002 | Lohman et al. | |
| 6,374,232 B1 | 4/2002 | Dageville et al. | |
| 6,438,542 B1 | 8/2002 | Koo et al. | |
| 6,496,819 B1 * | 12/2002 | Bello et al. | 707/3 |
| 6,807,546 B2 * | 10/2004 | Young-Lai | 707/102 |
| 6,882,993 B1 * | 4/2005 | Lawande et al. | 707/2 |
| 6,990,503 B1 * | 1/2006 | Luo et al. | 707/200 |
| 2002/0194157 A1 | 12/2002 | Zait et al. | |
| 2003/0061189 A1 | 3/2003 | Baskins et al. | |
| 2003/0061227 A1 | 3/2003 | Baskins et al. | |
| 2003/0191774 A1 * | 10/2003 | Slutz | 707/102 |
| 2004/0122804 A1 * | 6/2004 | Zhang et al. | 707/3 |
| 2005/0120001 A1 * | 6/2005 | Yagoub et al. | 707/3 |

OTHER PUBLICATIONS

Hamid Pirahesh, Joseph M. Hellerstein and Waquar Hasan 1992, Extensible/Rule Based Query Rewrite Optimization in Starburst, pp. 38-48.*

Oracle7 Tuning, release 7.3.3, Managing Partition Views, copy right 1997.*

Gauram Bhargava et al, "Efficient processing of outer joins and aggregate functions," 1996, IEEE, pp. 411-449.

* cited by examiner

QUERY TRANSFORMATION FOR UNION ALL VIEW JOIN QUERIES USING JOIN PREDICATES FOR PRUNING AND DISTRIBUTION

BACKGROUND OF THE INVENTION

1. Field of the Invention

This invention relates in general to database management systems performed by computers, and in particular, to query transformation for multiple UNION ALL view join queries using join predicates for pruning and distribution.

2. Description of Related Art

Computer systems incorporating Relational DataBase Management System (RDBMS) software using Structured Query Language (SQL) interface are well known in the art. The SQL interface has evolved into a standard language for RDBMS software and has been adopted as such by both the American National Standards Institute (ANSI) and the International Standards Organization (ISO).

For most RDBMS software, combinations of tables and views are used to access data stored in tables in the database. A view definition includes a query that, if processed, provides a temporary result table based on the results of the query at that point in time.

To enhance maintainability, usability, and performance in database applications with very large data volumes, a UNION ALL view feature has been widely used to partition large tables into smaller tables. A typical partitioning mechanism is based on time. For example, data can be organized into monthly tables, and a UNION ALL view of these monthly tables is used to provide a logical view of all data. Some sophisticated applications have many views with UNION ALL, and join these views in queries.

Existing query optimization techniques will use local predicates in a query to prune useless branches of a UNION ALL view. Moreover, the distribution will generate joins for the remaining branches. These techniques may not be effective for queries with joins of multiple UNION ALL views, for the following reasons.

Although each branch of a UNION ALL view has a local predicate, such as YEAR=2001, the referencing query may not have a local predicate on the view, or it may only have local predicates on other columns. This makes pruning based on local predicates useless, and none of the branches can be pruned.

The distribution transformation will generate joins of branches of the joined views. The number of joins is the product of the number of the branches of the joined views. Consider the distribution of A*B*C, wherein A, B, C are UNION ALL views of four base tables each, A=(A1+A2+A3+A4), B=(B1+B2+B3+B4), C=(C1+C2+C3+C4), * indicates a join and + indicates a UNION ALL. Performing A*B*C without sub-select pruning due to lack of local predicates will result in:

$(A1+A2+A3+A4)*(B1+B2+B3+B4)*C1+$ $(A1+A2+A3+A4)*(B1+B2+B3+B4)*C2+$ $(A1+A2+A3+A4)*(B1+B2+B3+B4)*C3+$ $(A1+A2+A3+A4)*(B1+B2+B3+B4)*C4$ after just distributing A*B into view C. The complete list, after performing distribution into view B and then view A, would contain 64 branches of the UNION ALL view.

When the number of branches of the UNION ALL views gets a little larger, this creates two major problems during the compilation (bind) time. First, it exceeds the query processing limits, the processing cannot continue, or if the limit is not exceeded, it consumes excessive storage at the bind time. Second, bind time is excessively long.

Among the joins generated, many of them are non-overlapping and produce empty results. For example, a branch with YEAR=2001 of view A joining a branch with YEAR=2002 of view B results in an empty result. All the resources at both the bind time and the run time on these empty-result joins are wasted.

Thus, there is a need in the art for a solution for this class of multiple UNION ALL view join queries that solves the above shortcomings. The present invention satisfies these needs.

SUMMARY OF THE INVENTION

To overcome the limitations in the prior art described above, and to overcome other limitations that will become apparent upon reading and understanding the present specification, the present invention discloses a method, apparatus, and article of manufacture for optimizing a query in a computer system, wherein the query is performed by the computer system to retrieve data from a database stored on the computer system. The optimization includes: (a) combining join predicates from a query with local predicates from each branch of one or more UNION ALL views referenced by the query; (b) analyzing the combined predicates; and (c) not generating the join when the analysis step indicates that the combined predicates lead to an empty result for the join.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural and functional changes may be made without departing from the scope of the present invention.

Hardware and Software Environment

Figure 1:
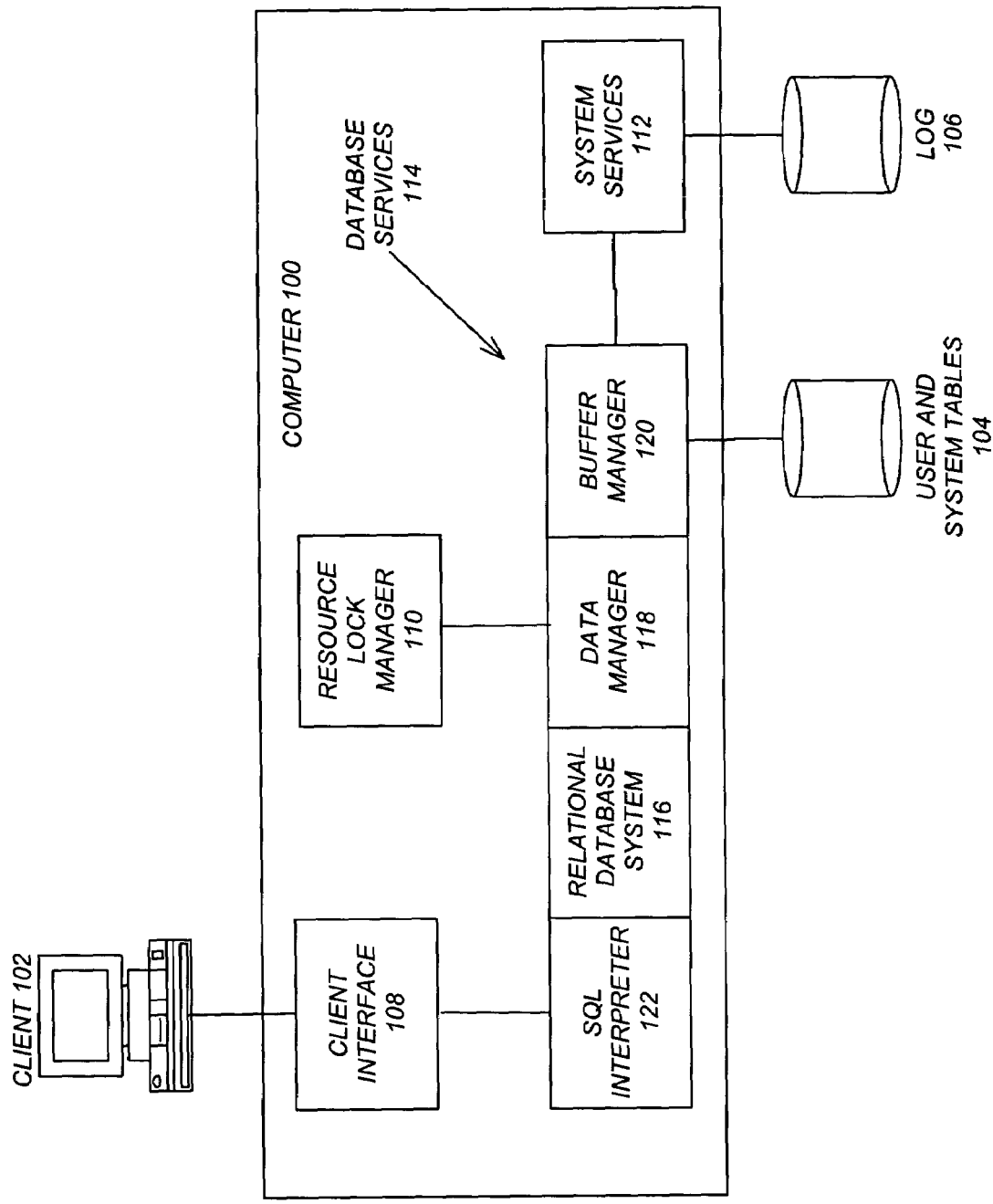
FIG. 1 illustrates an exemplary computer hardware and software environment that could be used with an embodiment of the present invention.

FIG. 1 illustrates an exemplary computer hardware and software environment that could be used with the present invention. In the exemplary environment, a server system 100 is connected to one or more client systems 102, in order to manage one or more databases 104 and 106 shared among the client systems 102.

Operators of the client systems 102 use a standard operator interface 108 to transmit commands to and from the server system 100 that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2 product offered by IBM for the MVS, LINUX, UNIX, WINDOWS or OS/2 operating systems. Those skilled in the art will recognize, however, that the present invention has application to any RDBMS software.

As illustrated in FIG. 1, the RDBMS includes three major components: the Resource Lock Manager (RLM) 110, the Systems Services module 112, and the Database Services module 114. The RLM 110 handles locking services, because the RDBMS treats data as a shared resource, thereby allowing any number of users to access the same data simultaneously, and thus concurrency control is required to isolate users and to maintain data integrity. The Systems Services module 112 controls the overall RDBMS execution environment, including managing log data sets 106, gathering statistics, handling startup and shutdown, and providing management support.

At the heart of the RDBMS architecture is the Database Services module 114. The Database Services module 114 contains several submodules, including a Relational Database System (RDS) 116, Data Manager 118, Buffer Manager 120, and SQL Interpreter 122. These submodules support the functions of the SQL language, i.e., definition, access control, retrieval, and update of user and system data.

Generally, each of the components, modules, and submodules of the RDBMS comprises instructions and/or data, and are embodied in or retrievable from a computer-readable device, or medium, e.g., a memory, a data storage device, a remote device coupled to the server computer 100 by a data communications device, etc. Moreover, these instructions and/or data, when read, executed, and/or interpreted by the server computer 100, cause the server computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", as used herein is intended to encompass a computer program accessible from any computer-readable device or media.

Of course, those skilled in the art will recognize many modifications may be made to this configuration without departing from the scope of the present invention. Specifically, those skilled in the art will recognize that any combination of the above components, or any number of different components, including computer programs, peripherals, and other devices, may be used to implement the present invention, so long as similar functions are performed thereby.

Interactive SQL Execution

Figure 2:
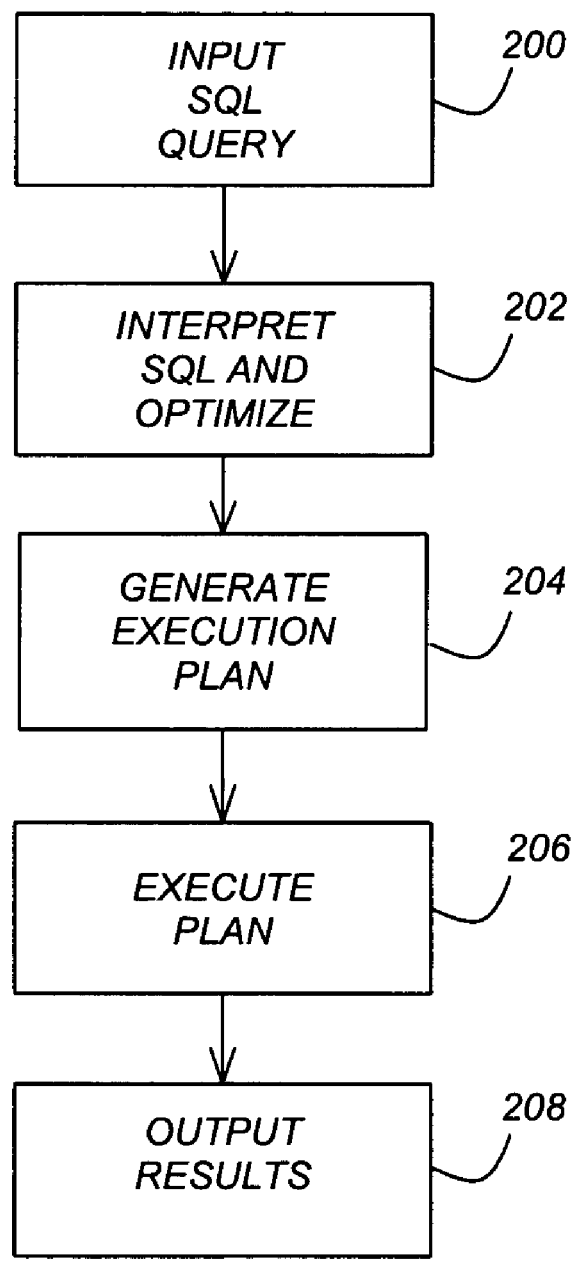
FIG. 2 is a flowchart illustrating the steps necessary for the interpretation and execution of SQL statements in an interactive environment according to an embodiment of the present invention.

FIG. 2 is a flowchart illustrating the steps necessary for the interpretation and execution of SQL statements in an interactive environment according to the present invention. Block 200 represents the input of SQL statements into the server system 100. Block 202 represents the step of compiling or interpreting the SQL statements. An optimization function within block 202 may transform or optimize the SQL query in a manner described in more detail later in this specification. Generally, the SQL statements received as input specify only the desired data, but not how to retrieve the data. This step considers both the available access paths (indexes, sequential reads, etc.) and system held statistics on the data to be accessed (the size of the table, the number of distinct values in a particular column, etc.), to choose what it considers to be the most efficient access path for the query. Block 204 represents the step of generating a compiled set of runtime structures called an execution plan from the compiled SQL statements. Block 206 represents the execution of the execution plan and Block 208 represents the output of the results.

Embedded/Batch SQL Execution

Figure 3:
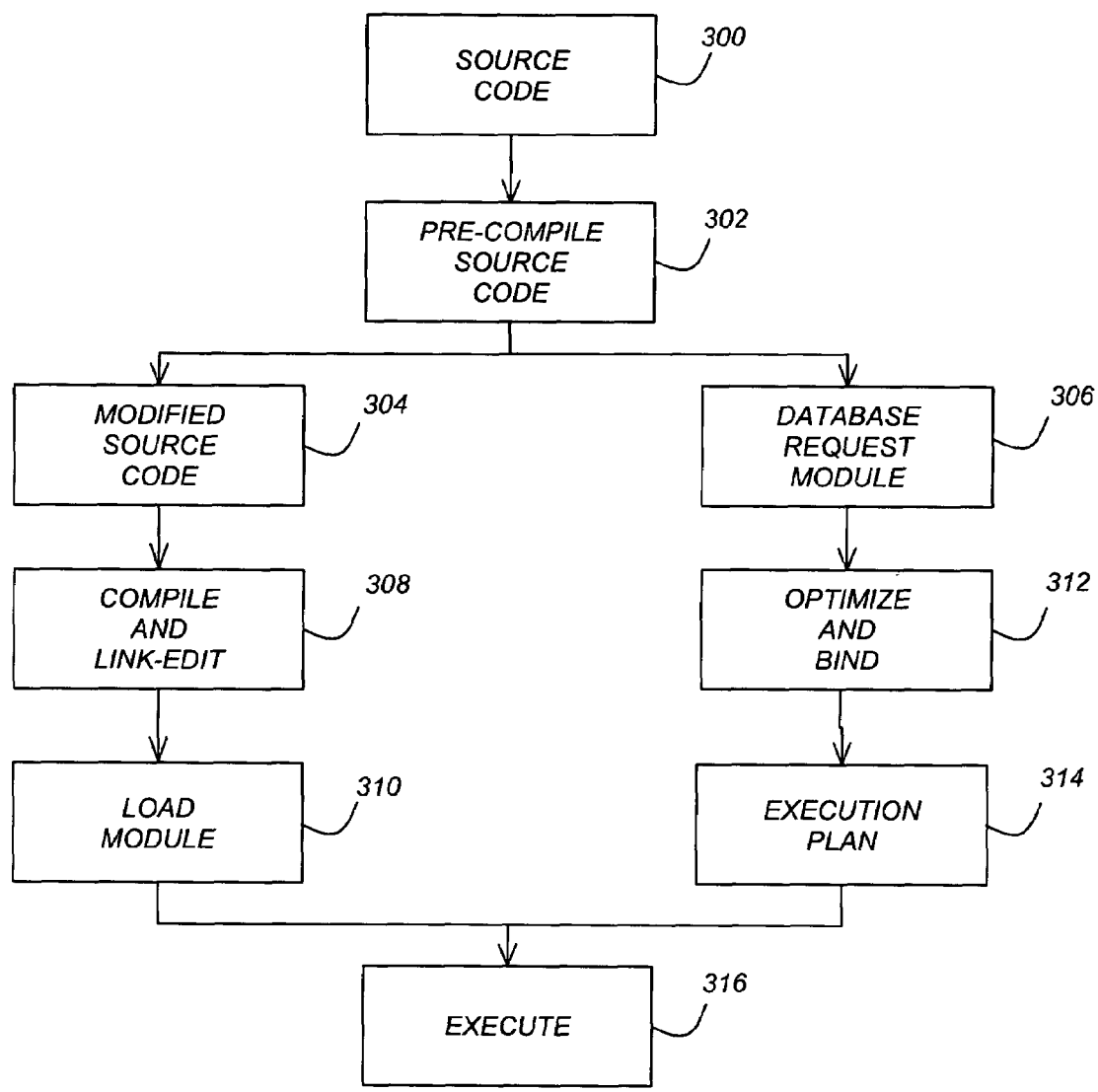
FIG. 3 is a flowchart illustrating the steps necessary for the interpretation and execution of SQL statements embedded in source code of a host language according to an embodiment of the present invention.

FIG. 3 is a flowchart illustrating the steps necessary for the interpretation and execution of SQL statements embedded in source code according to the present invention. Block 300 represents program source code containing a host language (such as COBOL or C) and embedded SQL statements. The program source code is then input to a pre-compile step 302. There are two outputs from the pre-compile step 302: a modified source module 304 and a Database Request Module (DBRM) 306. The modified source module 304 contains host language calls to the RDBMS, which the pre-compile step 302 inserts in place of SQL statements. The DBRM 306 is comprised of the SQL statements from the program source code 300. A compile and link-edit step 308 uses the modified source module 304 to produce a load module 310, while an optimize and bind step 312 uses the DBRM 306 to produce a compiled set of runtime structures for the execution plan 314. As indicated above in conjunction with FIG. 2, the SQL statements from the program source code 300 specify only the desired data, but not how to retrieve the data. The optimize and bind step 312 may optimize the SQL query in a manner described in more detail later in this specification. Thereafter, the optimize and bind step 312 considers both the available access paths (indexes, sequential reads, etc.) and system held statistics on the data to be accessed (the size of the table, the number of distinct values in a particular column, etc.), to choose what it considers to be the most efficient access path for the query. The load module 310 and execution plan 314 are then executed together at step 316.

Description of the Optimization Technique

The present invention discloses an improved optimization technique that is typically performed at step 202 of FIG. 2 or step 312 of FIG. 3. Specifically, the present invention discloses a method for query transformation for UNION ALL view join queries using join predicates for pruning and distribution.

The method performed at step 202 of FIG. 2 or step 312 of FIG. 3 comprises: (a) combining join predicates from a query with local predicates from each branch of one or more UNION ALL views referenced by the query; (b) analyzing the combined predicates; and (c) not generating the join when the analysis step indicates that the combined predicates lead to an empty result for the join. This substantially reduces the number of joins generated, thus avoiding the shortcomings listed above for the class of UNION ALL view join queries.

For a query that contains a join of n views, each of which is a union of m base tables, the query would have been expanded into a union of $m^n$ n-table joins with prior art techniques. With the method proposed herein, however, this number $m^n$ could be dramatically reduced, even possibly to m in some cases.

| Number of views joined in a query (JOIN v1, v2, . . . , vn) | Number of tables unioned in a view (vi as ti1 UA ti2 UA . . . UA tim) | Current resulting number of joins when internally rewritten at intermediate level | Resulting number of joins with the proposed method (best case) |
|---|---|---|---|
| 2 | 4 | 16 | 4 |
| 3 | 4 | 64 | 4 |
| 2 | 25 | 625 | 25 |
| 3 | 25 | 15625 | 25 |

Moreover, the technique of the present invention reduces both space and time at the bind time, and also eliminates the need to evaluate the empty joins at the runtime.

Assumptions

The present invention is best described by example. Consider an SQL query (or a query block in a larger query) of the following form:

SELECT select-list
FROM tables, or views, or table expressions
WHERE . . .
[GROUP BY . . . ];

1. The above query block joins two or more UNION ALL views. It can optionally contain other views, tables or table expressions, in the FROM clause, as part of the overall join.
2. Each UNION ALL view contains a UNION ALL of one base table with a local predicate specifying a data range in the base table. (For simplicity of description, it is assumed that there is one table in each branch, but the technique also applies to cases with two or more base tables in a branch).
3. The join predicates are on columns of UNION ALL views that correspond to the local predicates.
4. The query has one of the following characteristics:
   Case A: A select-list of the query block does not contain an aggregate function, a DISTINCT modifier, or a GROUP BY clause;
   Case B: A select-list of the query block contains a DISTINCT modifier, but does not contain aggregate functions or a GROUP BY clause; or
   Case C: A select-list of the query block contains one or more aggregate functions and/or a GROUP BY clause.

Logic of the Preferred Embodiment

Figure 4:
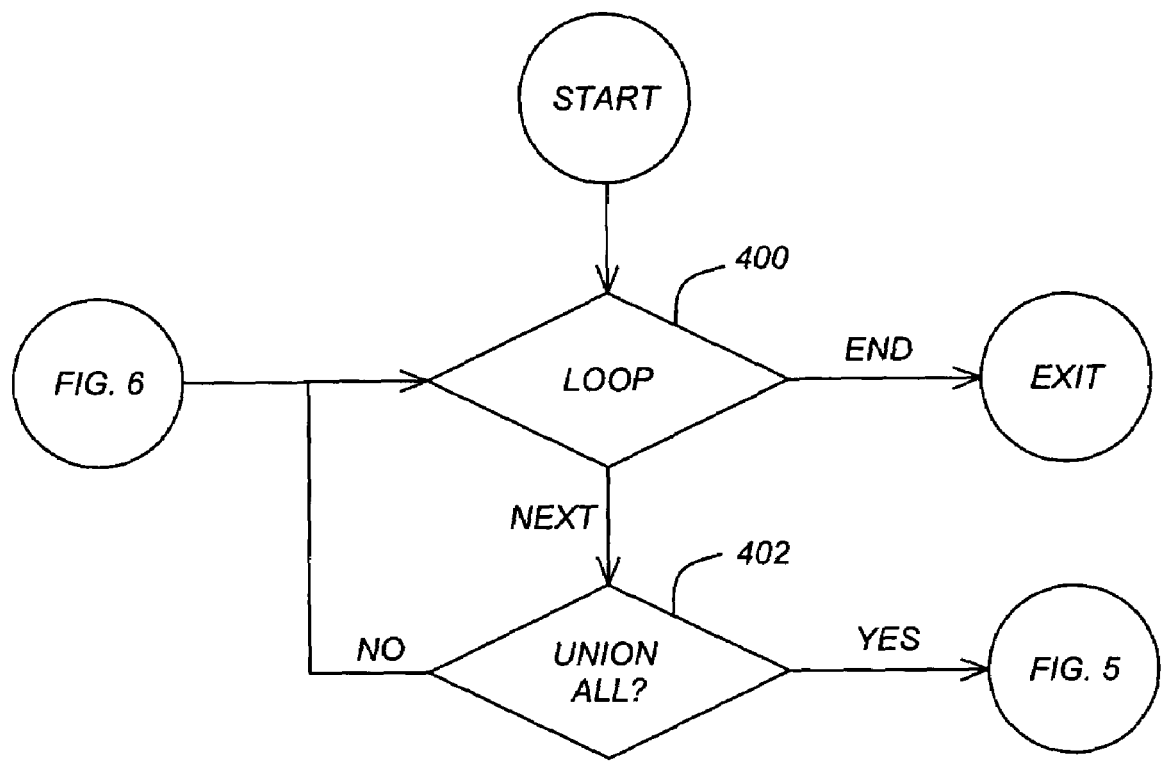
FIGS. 4–6 together are a flowchart illustrating the logic of the method for query transformation according to the preferred embodiment of the present invention.
Figure 5:
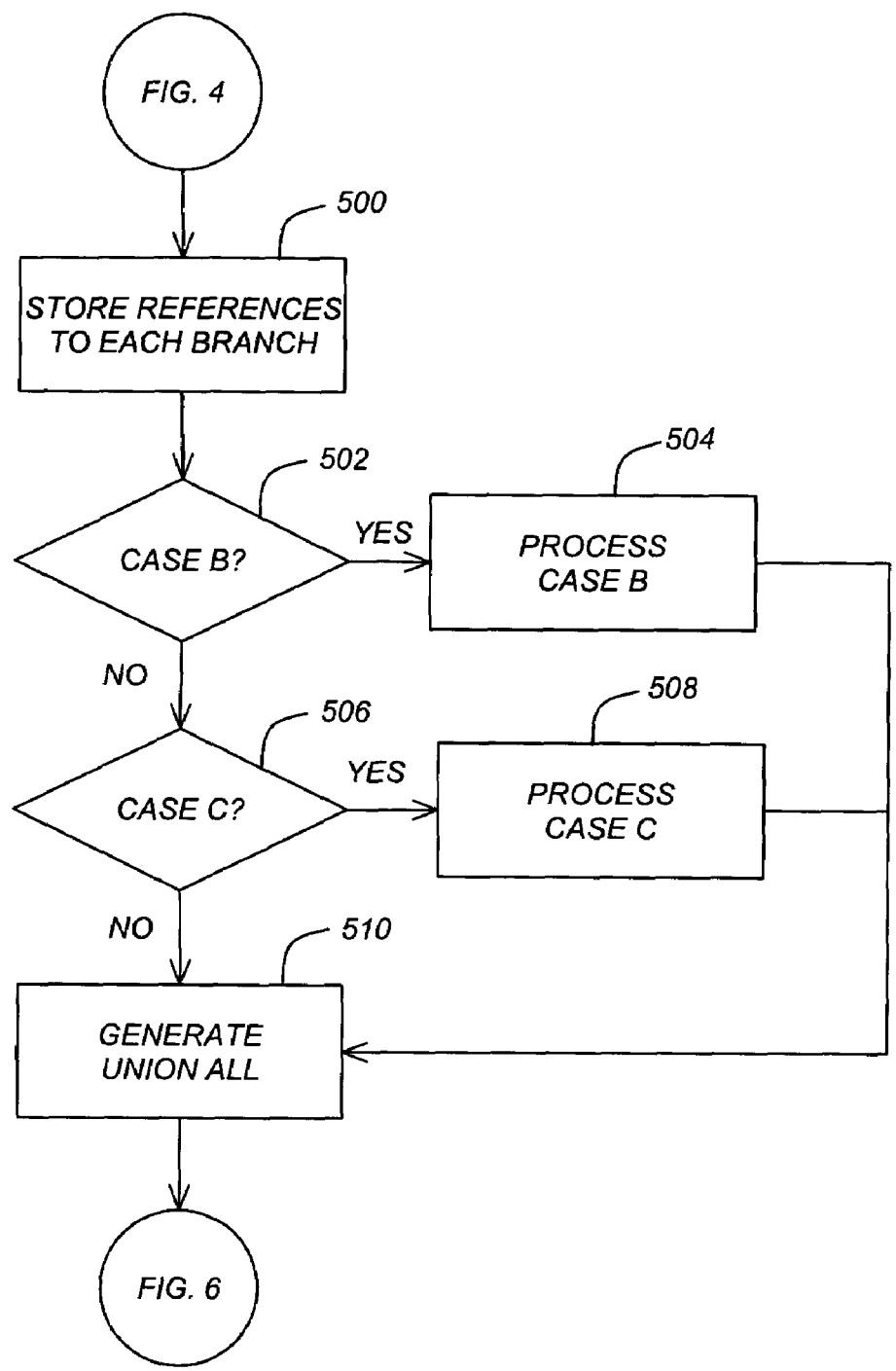
Figure 6:
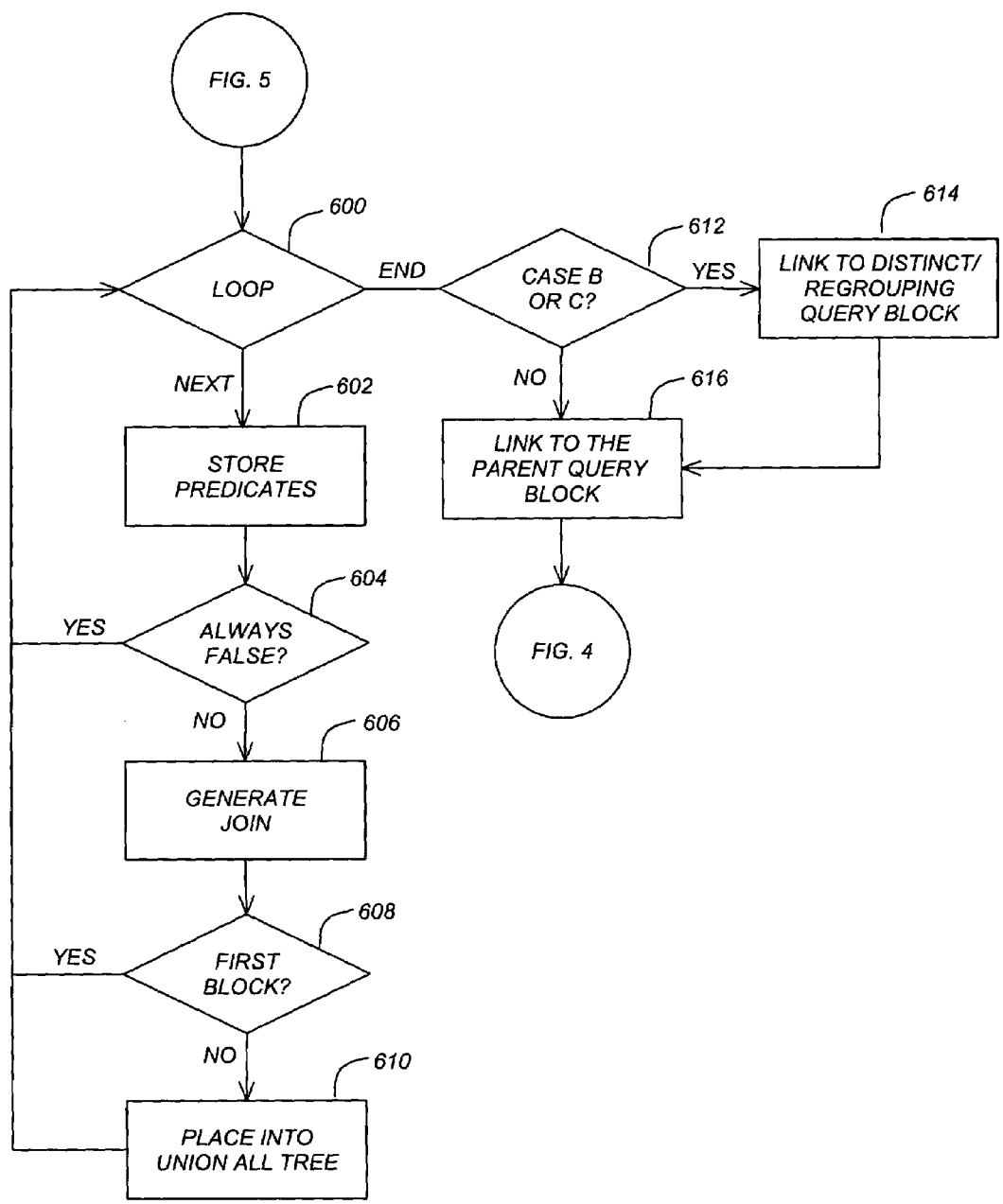

FIGS. 4–6 together are a flowchart illustrating the logic of the method for query transformation according to the preferred embodiment of the present invention.

Block 400 is a decision block that represents a loop through all query blocks. For each query block, control transfers to Block 402. Upon the end of the loop, the logic exits.

Block 402 is a decision block that determines whether the query block contains multiple views or table expressions (wherein the term "view" is used in the following discussion to refer to either a view or a table expression) with the UNION ALL patterns defined above (i.e., Cases A, B or C). If not, control transfers back to Block 400; otherwise, control transfers to FIG. 5.

Referring now to FIG. 5, Block 500 represents storing the references to the branches of each view in a different array, corresponding to the view.

Block 502 is a decision block that determines whether the query block is Case B, as described above, based on the select-list and the GROUP BY of the query block. If so, control transfers to Block 504; otherwise, control transfers to Block 506.

Block 504 represents the processing of query blocks that are Case B, wherein a new query block is created that includes a DISTINCT modifier with the same select-list as in the original query block. This new query block is designated as the parent query block for the new UNION ALL. Thereafter, control transfers to Block 510.

Block 506 is a decision block that determines whether the query block is Case C, as described above, based on the select-list and the GROUP BY of the query block. If so, control transfers to Block 508; otherwise, control transfers to Block 510.

Block 508 represents the processing of query blocks that are Case C, wherein a regrouping query block is created with the regrouping select-list and the regrouping GROUP BY clause derived from the original query block, and the select-list is used for distribution. Thereafter, control transfers to Block 510.

Block 510 represents generating a UNION ALL of all the resultant query blocks for overlapping joins (with the understanding that if there is only one result overlapping join, there is no need for a UNION ALL). Thereafter, control transfers to FIG. 6.

Referring now to FIG. 6, Block 600 is a decision block that represents a nested loop on the arrays, by looping through the combinations of the branches of the views. For each combination of the branches of the views, control transfers to Block 602; otherwise, upon completion of the loop, control transfers to Block 612.

Blocks 602–614 represent pruning logic that determines whether the combined predicates are contradictory.

Block 602 represents storing all applicable predicates (intervals) on a column into a list from local predicates on columns of the branches, through column correspondence and join predicate transitive closure.

Block 604 is a decision block that determines whether the predicates always evaluate to FALSE (indicating that the predicates are contradictory). If so, then no join is generated and control transfers to Block 600; otherwise, control transfers to Block 606.

Block 606 represents generating a join for the branch if the predicates are not contradictory as follows:

A) The FROM clause includes branches in place of views, and the rest of the FROM clause of the original view referencing query block is copied;

B) The distribution select-list with column mappings (references to views are mapped to references to branches) is copied;

C) The WHERE predicate from the branches, and the WHERE predicate from the original view referencing query block, with the column mapping (as above), are copied and connected with the AND Boolean operator; and D) The GROUP BY clause with column mapping is copied.

Thereafter, control transfers to Block 608.

Block 608 is a decision block that determines whether this is the first query block. If not, then control transfers to Block 610; otherwise, control transfers to Block 600.

Block 610 represents placing the query block into the UNION ALL tree with previously constructed query block or UNION ALL tree. Thereafter, control transfers to Block 600.

Upon completion of the loop, Block 612 is a decision block that determines whether the query block is a Case B or C. If so, then control transfers to Block 614; otherwise, control transfers to Block 616.

Block 614 represents, once all the branches are generated, linking to the regrouping/DISTINCT query block. Thereafter, control transfers to Block 616.

Block 616 represents linking the query block constructed, either UNION ALL query block for Case A, or regrouping/DISTINCT query block for Case B and C, to the parent query block, in place of the original query block. Thereafter, control transfers to FIG. 4.

More Details on the Pruning Logic

The pruning logic, given a list of predicates on a column, including those generated from column equivalence transitive closure, determines whether the predicates will always be FALSE.

Consider the example of predicates C=a, C>b, C<c. They are AND-connected. The method of determining whether the predicates will always be FALSE comprises the following:

1. Place the constants into a list of intervals: [a, a], (b, infinite), (−infinite, c), wherein ( ) indicate exclusive boundaries to the intervals and [] indicate inclusive boundaries to the intervals.

2. Loop through the list to consolidate the intervals. If the consolidated interval is empty, the predicate will always be FALSE, and the corresponding branch combination is pruned.

For example, consider [a, a] and (b, infinite). If a>b, then the consolidated interval is [a, a]; otherwise, if (a<=b), then the result interval is empty.

In another example, consider [a, a] and (−infinite, c). If a<c, then the result interval is [a, a]; otherwise, if a>=c, then the result interval is empty.

This logic only considers AND-connected predicates. To extend the logic to OR-connected predicates (or an IN-list) on a column, a hierarchical structure is needed. For OR-connected predicates, one entry in the AND-connected list is used, which points to a list of OR-connected intervals.

For example, C=a AND C>b AND C<c AND (C=d1 OR C=d2 OR C>=d3) can be referred to as:

[a, a], (b, infinite), (−infinite, c), OR-list wherein the OR-list can be referred to as:

[d1, d1], [d2, d2], [d3, infinite)

When the logic addresses the OR-list, the current interval (or interval list) is AND-connected to each interval in the OR-list. The result is OR-connected. If all intervals are empty, then the result is FALSE always. If one interval remains, pruning cannot be performed.

For example, assume the result interval is [a, a] before the OR-list is encountered in the above example. The system considers [a, a] and [d1, d1], assuming a !=d1, then the result interval is empty. Then, the system considers [a, a] and [d2, d2], it is empty again (with a !=d2). Finally, the system considers [a, a] and [d3, infinite), if a>=d3, then [a, a] is the result interval and no pruning is possible. If a<d3, the result is an empty interval, and pruning is performed. In the case of multiple OR-connected predicates, nested loops are needed to iterate over all the combinations of intervals.

Example:
CREATE VIEW UIVA AS
SELECT AYEAR, ADATA
FROM A2001
WHERE AYEAR='2001'
UNION ALL
SELECT AYEAR, ADATA
FROM A2002
WHERE AYEAR='2002'
UNION ALL
SELECT AYEAR, ADATA
FROM A2003
WHERE AYEAR='2003'
CREATE VIEW UIVB AS
SELECT BYEAR, BDATA
FROM B2001
WHERE BYEAR='2001'
UNION ALL
SELECT BYEAR, BDATA
FROM B2002
WHERE BYEAR='2002'
UNION ALL
SELECT BYEAR, BDATA
FROM B2003
WHERE BYEAR='2003'

Note that the following query that joins these two UNION ALL views, UIVA and UIVB, can be rewritten with the proposed method as follows:

Case A:
SELECT AYEAR, ADATA, BDATA
FROM UIVA,UIVB
WHERE AYEAR=BYEAR;

The proposed method will rewrite the above query as follows:
SELECT AYEAR, ADATA, BDATA
FROM A2001, B2001
WHERE AYEAR=BYEAR AND AYEAR='2001' AND BYEAR='2001'
UNION ALL
SELECT AYEAR, ADATA, BDATA
FROM A2002, B2002
WHERE AYEAR=BYEAR AND AYEAR='2002' AND BYEAR='2002'
UNION ALL
SELECT AYEAR, ADATA, BDATA
FROM A2003, B2003
WHERE AYEAR=BYEAR AND AYEAR='2003' AND BYEAR='2003';

Note that the original query is expanded into three sub-selects tied together with a UNION ALL. The predicates from the definition of the views, UIVA and UIVB, have been "bubbled up" into the referencing query and distributed appropriately to the branch that has the associated joins of the base tables. Without the application of this proposed method, the intermediate structure, in effect, will require storage space for nine sub-selects tied together with a UNION ALL, instead of three sub-selects.

Case B:
SELECT DISTINCT AYEAR, ADATA, BDATA
FROM UIVA,UIVB
WHERE AYEAR=BYEAR;

The proposed method will rewrite the above query as follows:
SELECT DISTINCT AYEAR, ADATA, BDATA
FROM
(SELECT AYEAR, ADATA, BDATA
FROM A2001, B2001
WHERE AYEAR=BYEAR AND AYEAR='2001' AND BYEAR='2001'
UNION ALL
SELECT AYEAR, ADATA, BDATA
FROM A2002, B2002
WHERE AYEAR=BYEAR AND AYEAR='2002' AND BYEAR='2002'
UNION ALL
SELECT AYEAR, ADATA, BDATA
FROM A2003, B2003
WHERE AYEAR=BYEAR AND AYEAR='2003' AND BYEAR='2003'
) X(AYEAR, ADATA, BDATA)
;

Case C:
SELECT AYEAR, SUM(ADATA), COUNT(BDATA)
FROM UIVA,UIVB, TC
WHERE AYEAR=BYEAR AND
UIVB.C=TC.C
GROUP BY AYEAR;

Notice an extra table TC in the FROM clause. The proposed method will rewrite the above query as follows:
SELECT AYEAR, SUM(SUMADATA), SUM(CNTBDATA)
FROM
(SELECT AYEAR, SUM(ADATA), COUNT(BDATA)
FROM A2001, B2001, TC
WHERE AYEAR=BYEAR AND AYEAR='2001' AND BYEAR='2001' AND
B2001.C=TC.C
GROUP BY AYEAR
UNION ALL
SELECT AYEAR, SUM(ADATA), COUNT(BDATA)
FROM A2002, B2002, TC
WHERE AYEAR=BYEAR AND AYEAR='2002' AND BYEAR='2002' AND
B2002.C=TC.C
GROUP BY AYEAR
UNION ALL
SELECT AYEAR, SUM(ADATA), COUNT(BDATA)
FROM A2003, B2003, TC
WHERE AYEAR=BYEAR AND AYEAR='2003' AND BYEAR='2003' AND
B2003.C=TC.C
GROUP BY AYEAR
) X(AYEAR, SUMADATA, CNTBDATA)
GROUP BY AYEAR;

Conclusion

This concludes the description of the preferred embodiment of the invention. The following describes some alternative embodiments for accomplishing the present invention. For example, any type of computer, such as a mainframe, minicomputer, or personal computer, could be used with the present invention. In addition, any software program performing database queries with grouping and/or aggregation could benefit from the present invention.

In summary, the present invention discloses a method, apparatus, and article of manufacture for optimizing a query in a computer system, wherein the query is performed by the computer system to retrieve data from a database stored on the computer system. The optimization includes: (a) combining join predicates from a query with local predicates from each branch of one or more UNION ALL views referenced by the query; (b) analyzing the combined predicates; and (c) not generating the join when the analysis step indicates that the combined predicates lead to an empty result for the join.

The foregoing description of the preferred embodiment of the invention has been presented for the purposes of illustration and description. It is not intended to be exhaustive or to limit the invention to the precise form disclosed. Many modifications and variations are possible in light of the above teaching.

What is claimed is:

1. A method of optimizing a query in a computer system, the query being performed by the computer system to retrieve data from a database stored on the computer system, the method comprising:

(a) combining join predicates from a query with local predicates from each branch of one or more UNION ALL views referenced by the query, wherein the query joins two or more of the UNION ALL views, each UNION ALL view contains a UNION ALL of one base table with a local predicate specifying a data range in the base table, and the join predicates are on columns of the UNION ALL views that correspond to the local predicates;

(b) analyzing the combined predicates; and (c) generating a join, except when the analyzing step indicates that the combined predicates are always FALSE and the join generates an empty result.

2. The method of claim 1, wherein a select-list of the query does not contain aggregate functions, a DISTINCT modifier, or a GROUP BY clause.

3. The method of claim 1, wherein a select-list of the query contains a DISTINCT modifier, but does not contain aggregate functions or a GROUP BY clause.

4. The method of claim 3, further comprising creating a new query block that includes a DISTINCT modifier with the select-list as a parent query block.

5. The method of claim 1, wherein a select-list of the query contains one or more aggregate functions or a GROUP BY clause.

6. The method of claim 5, further comprising creating a regrouping query block with a regrouping select-list and the GROUP BY clause, and another select-list used for distribution.

7. The method of claim 1, wherein pruning logic determines whether the combined predicates are contradictory.

8. The method of claim 7, wherein the combined predicates are contradictory if the predicates always evaluate to FALSE.

9. The method of claim 8, wherein no join is generated if the combined predicates are contradictory.

10. The method of claim 8, wherein the join is generated if the combined predicates are not contradictory.

11. A computer-implemented apparatus for optimizing a query, comprising:
   (a) a computer system;
   (b) means, performed by the computer system, for:
      (1) combining join predicates from a query with local predicates from each branch of one or more UNION ALL views referenced by the query, wherein the query joins two or more of the UNION ALL views, each UNION ALL view contains a UNION ALL of one base table with a local predicate specifying a data range in the base table, and the join predicates are on columns of the UNION ALL views that correspond to the local predicates;
      (2) analyzing the combined predicates; and
      (3) generating a join, except when the analyzing step indicates that the combined predicates are always FALSE and the join generates an empty result.

12. The apparatus of claim 11, wherein a select-list of the query does not contain aggregate functions, a DISTINCT modifier, or a GROUP BY clause.

13. The apparatus of claim 11, wherein a select-list of the query contains a DISTINCT modifier, but does not contain aggregate functions or a GROUP BY clause.

14. The apparatus of claim 13, further comprising logic for creating a new query block that includes a DISTINCT modifier with the select-list as a parent query block.

15. The apparatus of claim 11, wherein a select-list of the query contains one or more aggregate functions or a GROUP BY clause.

16. The apparatus of claim 15, further comprising logic for creating a regrouping query block with a regrouping select-list and the GROUP BY clause, and another select-list used for distribution.

17. The apparatus of claim 11, wherein pruning logic determines whether the combined predicates are contradictory.

18. The apparatus of claim 17, wherein the combined predicates are contradictory if the predicates always evaluate to FALSE.

19. The apparatus of claim 18, wherein no join is generated if the combined predicates are contradictory.

20. The apparatus of claim 18, wherein the join is generated if the combined predicates are not contradictory.

21. An article of manufacture comprising a computer-readable storage media embodying instructions that, when read and executed by a computer system, results in the computer system performing a method for optimizing a query, the query being performed by the computer system to retrieve data from a database stored in a data storage device coupled to the computer system, the method comprising:
   (a) combining join predicates from a query with local predicates from each branch of one or more UNION ALL views referenced by the query, wherein the query joins two or more of the UNION ALL views, each UNION ALL view contains a UNION ALL of one base table with a local predicate specifying a data range in the base table, and the join predicates are on columns of the UNION ALL views that correspond to the local predicates;
   (b) analyzing the combined predicates; and
   (c) generating a join, except when the analyzing step indicates that the combined predicates are always FALSE and the join generates an empty result.

22. The article of claim 21, wherein a select-list of the query does not contain aggregate functions, a DISTINCT modifier, or a GROUP BY clause.

23. The article of claim 21, wherein a select-list of the query contains a DISTINCT modifier, but does not contain aggregate functions or a GROUP BY clause.

24. The article of claim 23, further comprising creating a new query block that includes a DISTINCT modifier with the select-list as a parent query block.

25. The article of claim 21, wherein a select-list of the query contains one or more aggregate functions or a GROUP BY clause.

26. The article of claim 25, further comprising creating a regrouping query block with a regrouping select-list and the GROUP BY clause, and another select-list used for distribution.

27. The article of claim 21, wherein pruning logic determines whether the combined predicates are contradictory.

28. The article of claim 27, wherein the combined predicates are contradictory if the predicates always evaluate to FALSE.

29. The article of claim 28, wherein no join is generated if the combined predicates are contradictory.

30. The article of claim 28, wherein the join is generated if the combined predicates are not contradictory.

* * * * *